US012792881B1

(12) United States Patent
Sudjianto et al.

(10) Patent No.: US 12,792,881 B1
(45) Date of Patent: Nov. 10, 2026

(54) SYSTEMS AND METHODS FOR INFERENCE GENERATION USING A CONJOINED NEURAL NETWORK INFERENCE MODEL

(71) Applicant: Wells Fargo Bank, N.A., San Francisco, CA (US)

(72) Inventors: Agus Sudjianto, Charlotte, NC (US); Jinwen Qiu, Charlotte, NC (US); Jie Chen, Fremont, CA (US); Aijun Zhang, Hong Kong (CN)

(73) Assignee: Wells Fargo Bank, N.A., San Francisco, CA (US)

( * ) Notice: Subject to any disclaimer, the term of this patent is extended or adjusted under 35 U.S.C. 154(b) by 1046 days.

(21) Appl. No.: 18/051,146

(22) Filed: Oct. 31, 2022

Related U.S. Application Data

(60) Provisional application No. 63/265,803, filed on Dec. 21, 2021.

(51) Int. Cl.
*G06N 3/045* (2023.01)

(52) U.S. Cl.
CPC .................................... *G06N 3/045* (2023.01)

(58) Field of Classification Search
CPC ...................................................... G06N 3/045
See application file for complete search history.

(56) References Cited

U.S. PATENT DOCUMENTS 10,706,453 B1 * 7/2020 Morin ...................... G06N 5/01
11,562,252 B2 * 1/2023 Walters ................ G06N 3/0442
2024/0062075 A1 * 2/2024 Shriver .................... G06N 7/01

OTHER PUBLICATIONS

Lungu, "Siamese Networks for Few-Shot Learning on Edge Embedded Devices" IEEE, 2020 (Year: 2020).*
Amir Ilkhechi, "DeepSqueeze: Deep Semantic Compression for Tabular Data", IEEE, 2020 (Year: 2020).*
L. Breiman, "Random forests", Machine learning, 45(1): 5-32, 2001. (33 pages).
T. Chen et al., Xgboost: extreme gradientboosting, R package version 0.4-2, pp. 1-4, 2015. (4 pages).

(Continued)

*Primary Examiner* — Van C Mang
(74) *Attorney, Agent, or Firm* — K&L Gates LLP

(57) ABSTRACT

Systems, apparatuses, methods, and computer program products are disclosed for performing computer-implemented services using inferences. The inferences may be generated by inference models and may be generated for discontinuous input data. An example method includes feeding discontinuous input data into a conjoined neural network inference model to obtain inferences. A conjoined neural network inference model may utilize two sub-layers in the hidden layer of the conjoined neural network, each sub-layer including an inference model. Each sub-layer may generate intermediate outputs, which may be combined in an interaction layer of the conjoined neural network inference model. The use of two sub-layers and the interaction layer may provide for more efficient inference generation for discontinuous input data while maintaining a desired level of inference accuracy. Inferences may be utilized to determine the type and quantity of computer-implemented services to provide to devices throughout a distributed system.

20 Claims, 13 Drawing Sheets

(56) References Cited

OTHER PUBLICATIONS

J. Frankle et al., "The lottery ticket hypothesis: Finding sparse, trainable neural networks", arXiv preprint arXiv:1803.03635, 2018. (42 pages).
D. Heath, et al., "Induction of oblique decision trees". In IJCAI, vol. 1993, pp. 1002-1007. Citeseer, 1993. (6 pages).
S. M. Jayakumar et al., "Multiplicative interactions and where to find them", 2020.(16 pages).
M. Raghu et al., "On the expressive power of deep neural networks. In international conference on machine learning", pp. 2847-2854. PMLR, 2017. (8 pages).
A. Sudjianto et al., "Unwrapping the black box of deep relu networks: Interpretability, diagnostics, and simplication", arXiv preprint arXiv:2011.04041, 2020. (40 pages).

* cited by examiner

SYSTEMS AND METHODS FOR INFERENCE GENERATION USING A CONJOINED NEURAL NETWORK INFERENCE MODEL

CROSS-REFERENCE TO RELATED APPLICATIONS

This application claims the benefit of U.S. Provisional Patent Application No. 63/265,803, filed Dec. 21, 2021, the entire contents of which are incorporated herein by reference.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF SUMMARY

Communication systems facilitate a broad array of interactions between devices and users thereof. As part of these interactions, the devices may perform and/or receive computer-implemented services. In order to perform computer-implemented services, inference models may be used to generate inferences. The inferences may drive the performance of the computer-implemented services.

In some embodiments, the computer-implemented services may utilize discontinuous data (e.g., tabular data). Obtaining an effective inference model (e.g., an inference model that faithfully provides a known output over a given input range) may prove difficult for discontinuous data. Specifically, inference models may have difficulty attempting to represent the relationship between the discontinuous data and a desired output. Consequently, the inference model may not reliably produce the desired output over the entire range over which discontinuous data may run. The quality and reliability of the computer-implemented services provided by devices throughout a distributed system may depend on the ability of inference models to faithfully generate the desired output. Therefore, the computer-implemented services may be impaired if inference models that do not faithfully generate the desired output are used.

Inference models may be trained to generate inferences for a wide range of data sets and/or data collection scenarios. Artificial neural networks (e.g., neural networks) may utilize artificial neurons (e.g., neurons) to formulate inferences. A simpler artificial neural network (e.g., fewer artificial neurons and/or layers of artificial neurons) may be used to make accurate predictions based on continuous data. However, more complex artificial neural networks (e.g., more artificial neurons and/or layers of artificial neurons) may be required in order to make accurate predictions based on discontinuous data. A more complex artificial neural network may require more computing resources than a simpler artificial neural network and, therefore, may generate inferences inefficiently when processing tabular data or other types of discontinuous data.

In order to efficiently generate accurate inferences using tabular data, a conjoined neural network (ConjNN) inference model may be implemented. The ConjNN inference model may generate accurate inferences based on tabular data and may consume fewer computing resources than an artificial neural network without a conjoined architecture. In order to do so, the ConjNN inference model may include a hidden layer made up of two sub-layers. A first sub-layer of the two sub-layers may include a feed-forward neural network (FFNN) sub-layer and a second sub-layer of the two sub-layers may include a generalized additive model (GAM) sub-layer. In order to more efficiently process discontinuous data, each of the two sub-layers may independently produce intermediate outputs based on the discontinuous data. The intermediate outputs may be combined in an interaction layer of the ConjNN inference model by performing a multiplicative nonlinear transformation to generate a plurality of values of the elements of the interaction layer. The plurality of values may be projected on an output layer and subsequently utilized to obtain output data (e.g., an inference). The inference may be used in order to make a determination regarding the type and quantity of computer-implemented services to provide to devices throughout a distributed system.

In one example embodiment, a method is provided for obtaining inferences using inference models, where an inference model of the inference models is obtained by an inference model utilization device and used to provide computer-implemented service to clients associated with client devices (e.g., clients operating the client devices). The method may include obtaining, by the inference model utilization device, the inference model, the inference model comprising a trained conjoined neural network inference model. The method may also include obtaining, by communication hardware of the inference model utilization device and from at least one of the clients associated with the client devices, input data for the trained conjoined neural network inference model. The method may also include obtaining, by services circuitry of the inference model utilization device and using the input data, output data from the conjoined neural network inference model. The method may also include providing, at least in part by the communication hardware and to at least one of the clients associated with the client devices, computer-implemented services using the output data.

Obtaining the output data from the conjoined neural network inference model may comprise several actions. One action may include projecting, by an input layer of the conjoined neural network inference model, the input data onto two sub-layers of a hidden layer of the conjoined neural network inference model. Another action may include generating, by the two sub-layers of the hidden layer of the conjoined neural network inference model, two pluralities of intermediate outputs comprising a first plurality of intermediate outputs generated by a first of the two sub-layers. Another action may include combining, by an interaction layer of the conjoined neural network inference model, the two pluralities of intermediate outputs to obtain a plurality of values of elements of the interaction layer. Another action may include projecting, by the interaction layer, the plurality of values of the elements of the interaction layer on an output layer of the conjoined neural network inference model. Another action may include generating, by the output layer and using the projected plurality of values, the output data.

The first sub-layer may comprise a feed-forward neural network sub-layer and the second sub-layer may comprise a generalized additive model sub-layer.

The feed-forward neural network sub-layer may utilize a shared-neuron architecture.

The feed-forward neural network sub-layer may utilize a separated-neuron architecture.

The generalized additive model sub-layer may utilize an identity function.

The generalized additive model sub-layer may utilize a neural-network function.

The interaction layer may perform a multiplicative non-linear transformation to obtain the plurality of values of the elements of the interaction layer.

The input data may comprise values that range over a discontinuous data range, and the discontinuous data range may comprise at least one discontinuity between two discrete values. The data in the discontinuous data range (also referred to herein as "discontinuous data") may comprise tabular data, tabular data being quantized values organized in a data table. The quantized values organized in a data table may range over a range in which fidelity of information that the quantized values represent is degraded. In addition, the at least one discontinuity may divide the discontinuous data range into two sub-ranges that each converge to different points near the at least one discontinuity.

The computer-implemented services may comprise making a financial viability determination regarding the at least one of the clients associated with the client devices and extending a financial product offer to the at least one of the clients associated with the client devices based on the financial viability determination.

The foregoing brief summary is provided merely for purposes of summarizing some embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain embodiments in general terms above, reference will now be made to the accompanying drawings, which are not necessarily drawn to scale. Some embodiments may include fewer or more components than those shown in the figures.

DETAILED DESCRIPTION

Figure 1:
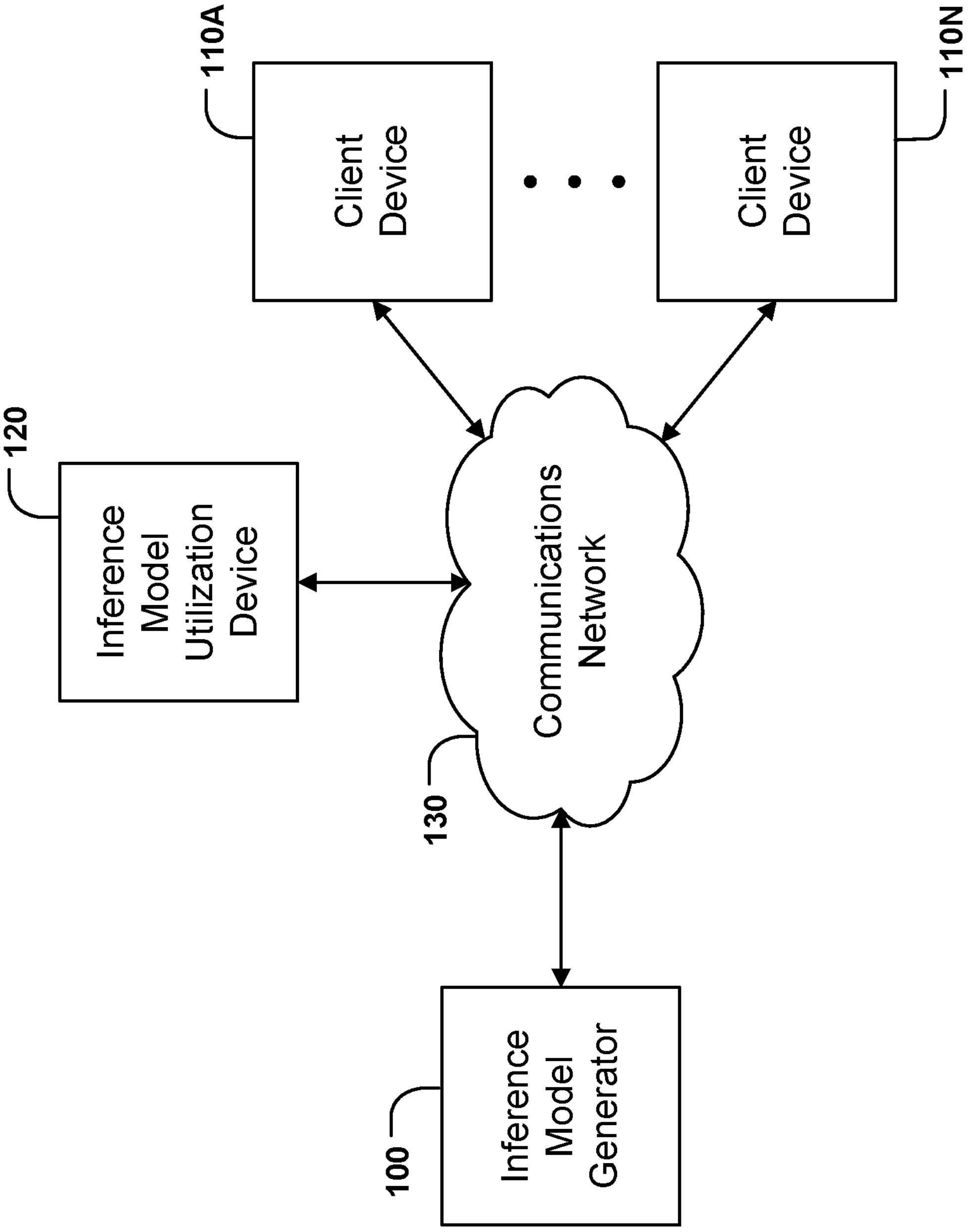
FIG. 1 illustrates a system in which some embodiments may be used for performing and/or receiving computer-implemented services.

Some embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for performing computer-implemented services. A distributed system may allow devices and users thereof to provide and obtain various computer-implemented services including, for example, data distribution, product distribution, and/or other types of computer-implemented services. As part of these computer-implemented services, inferences may be generated using inference models.

In order to determine the type and/or quantity of computer-implemented services to provide throughout a distributed system, devices may host and operate inference models. Inference models may be trained to make predictions (e.g., generate inferences) to make determinations based on input data over a wide range of implementations. Inference models may be implemented using artificial neural networks trained to make predictions based on input data. However, the computational efficiency of artificial neural networks may depend, at least in part, on the particular input data received. That is, when generating inferences with comparable accuracy, some artificial neural networks may be more computationally efficient for a given type of input data, when compared to other types of input data.

For example, artificial neural networks may be implemented using a simpler architecture (and, therefore, fewer computing resources) for continuous input data when compared with an architecture that can handle tabular input data (or other types of discontinuous input data). Continuous input data may not include discontinuities and may be divided into an infinite number of values without degrading the fidelity of the information represented by the values. In contrast, artificial neural networks may require a more complex architecture (and, therefore, more computing resources) to process discontinuous input data while providing a similar inference accuracy level. Discontinuous input data may include at least one discontinuity between two discrete values of the discontinuous input data. For example, discontinuous data may include tabular data, tabular data being quantized values organized in a data table. In order to generate accurate inferences based on discontinuous input data while conserving computing resources, a ConjNN inference model may be utilized.

A ConjNN inference model may efficiently generate inferences for discontinuous input data by utilizing two sub-layers in a hidden layer of the ConjNN. The first sub-layer of the hidden layer may be a FFNN sub-layer, and the second sub-layer of the hidden layer may be a GAM sub-layer. The input layer of the ConjNN may project the input data separately on each sub-layer. Each sub-layer may generate a plurality of intermediate outputs. The two pluralities of intermediate outputs may then be combined in an interaction layer. For example, the interaction layer may perform a multiplicative nonlinear transformation on the two pluralities of intermediate outputs. The interaction layer may generate a plurality of values of elements of the interaction layer, which may then be subsequently projected onto an output layer. The output layer may generate output data. Consequently, output data (e.g., inferences) may be obtained using discontinuous input data while conserving computational resources using a ConjNN and also meeting desired inference accuracy levels. Following the generation of output data (e.g., inferences), computer-implemented services may be provided to devices throughout the distributed system and based on the output data.

As mentioned previously, a ConjNN inference model may generate accurate inferences while utilizing fewer computing resources when compared to an inference model without a conjoined architecture. Users of devices throughout a distributed system may benefit from computer-implemented services based on these inferences. For example, a system providing computer-implemented services may be utilized by a bank to provide services to multiple clients. In a first example, a bank may operate an inference model that consumes a large percentage of the available computing resources when responding to a single request from a client. In this example, computing resources may be rationed by the system and services may be delayed. Consequently, clients may experience frustration due to longer wait times when attempting to request and receive the services that rely on inferences (or other types of services that may not utilize inferences but may use shared computing resources). In a second example, the bank may operate a ConjNN inference model to generate inferences with comparable accuracy to the inferences generated in the first example while consuming fewer computing resources. In this second example, the bank may be able to efficiently utilize available computing resources. By doing so, the bank may be able to respond more quickly to requests and, therefore, alleviate user frustration when performing the computer-implemented services.

Although a high-level explanation of the operations of embodiments has been provided above, specific details regarding the configuration of such embodiments are provided below.

System Architecture

Embodiments described herein may be implemented using any number and type of computing devices. To this end, FIG. 1 illustrates an example environment within which various embodiments may operate. As illustrated, the environment may include an inference model generator 100, an inference model utilization device 120, and any number of client devices 110A-110N. These devices may interact with one another to perform any number and types of computer-implemented services. When performing the computer-implemented services, the devices may utilize trained inference models to obtain inferences. The inferences may be based on input data provided by one or more of the devices, the input data being discontinuous data (e.g., tabular data). In order to facilitate the computer-implemented services, the devices may utilize a ConjNN inference model to obtain accurate inferences based on the discontinuous input data. The inferences may determine the quantity and type of computer-implemented service provided to clients associated with devices (e.g., client devices 110A-110N) throughout the distributed system. In addition, the ConjNN inference model may consume fewer computing resources than an inference model without a conjoined architecture. By consuming fewer computing resources during inference generation, the devices may provide more efficient and higher quality computer-implemented services to devices throughout a distributed system.

As used herein, the term inference model generator refers to a device that trains inference models. The term inference model utilization device refers to a device that obtains, hosts, and operates (e.g., utilizes, uses, etc.) an inference model to obtain inferences. The term client device refers to a device that receives computer-implemented services. Any device may be an inference model generator, an inference model utilization device and/or a client device (for example, a device may both generate and operate inference models) depending on their role, which may change over time.

The inference model generator 100 may be implemented using any number (one, many, etc.) and types of computing devices known in the art, such as desktop or laptop computers, tablet devices smartphones, or the like. The inference model generator 100 may be associated with corresponding users (e.g., administrators, representatives, other persons, etc.) that use the inference model generator to train inference models.

The users and/or applications hosted by the inference model generator 100 may train inference models and/or distribute inference models to devices (e.g., inference model utilization device 120) throughout a distributed system. In order to train inference models, the inference model generator 100 may obtain training data from sources (e.g., client devices 110A-110N) throughout the distributed system. The training data may include identifying information associated with the clients associated with the client devices 110A-110N and may include discontinuities. For example, the client associated with client device 110A may be a banking client requesting computer-implemented services (e.g., applying for a line of credit) from a bank that may utilize an inference model utilization device 120. The identifying information from the client associated with client device 110A may include the credit score of the client, the number of dependents associated with the client, the client's income, etc. The inference model generator 100 may utilize this training data to train inference models to determine whether to provide the computer-implemented service (e.g., whether to extend the line of credit to the client) and/or for other purposes. This training data may be discontinuous and inferences based on this training data may require significant computational resources to generate. In order to increase computational efficiency, the inference model generator 100 may train ConjNN inference models. The ConjNN inference models may generate accurate inferences while using fewer computing resources when the input data provided is discontinuous input data.

Discontinuous training data may include, for example, data that varies over a range of data values but may not take on one or more data values within the range. For example, discontinuous training data may include a number of dependents of a client. The number of dependents of the client may be any whole number (e.g., 0, 1, 2, or the like) within a range of 0 to 100. However, the number of dependents of the client may only be represented as whole numbers and, therefore, some numbers within the range of 0 to 100 (e.g., 0.5, 1.2, etc.) may be disallowed. Due to the disallowed data values within the range of 0 to 100, the number of dependents of the client may represent discontinuous training data.

In contrast, continuous training data may include, for example, data that varies over a range of data values and may have any data value within the range. For example, continuous training data may include a credit score for the client. The credit score for the client may be a number (e.g., 750) within a range of 300 to 850. Unlike the number of dependents of the client, the credit score for the client may be any number within the range of 300 to 850 (e.g., 750.55, 350.111, etc.). As no values in the range are disallowed, the credit score of the client may represent continuous training data. The training data may include any quantity of continuous and/or discontinuous training data.

The inference model utilization device 120 may be implemented using any number and types of computing devices known in the art, such as desktop or laptop computers, tablet devices, smartphones, or the like. The inference model utilization device 120 may provide computer-implemented services to clients associated with client devices and/or other devices and may operate trained inference models obtained from the inference model generator 100.

Like the inference model generator 100, the inference model utilization device 120 may be associated with corresponding users (e.g., administrators, customers, representatives, other persons, etc.) that use the inference model utilization device 120 to interact with one or more of the client devices 110A-110N (and/or other devices). The users and/or applications hosted by the inference model utilization device 120 may provide computer-implemented services to the clients associated with the client devices 110A-110N when interacting with them (and/or other devices). To determine the type and/or quantity of computer-implemented services to provide, the inference model utilization device 120 may utilize a ConjNN inference model to generate inferences based on input data from client devices 110A-110N.

The client devices 110A-110N may be implemented using any number and types of computing devices known in the art, such as desktop or laptop computers, tablet devices, smartphones, or the like. The client devices 110A-110N may provide computer-implemented services and/or receive computer-implemented services from the inference model utilization device 120 and/or other devices.

The client devices 110A-110N may be associated with corresponding users (e.g., clients, administrators, customers, representatives, other persons, etc.) that use the client devices 110A-110N to interact with the inference model utilization device 120 (and/or other devices). The client devices 110A-110N may be independent devices, or may in some embodiments be peripheral devices communicatively coupled to other computing devices. The users and/or applications hosted by the client devices 110A-110N may receive computer-implemented services based on inferences generated by the inference model utilization device 120 (and/or other devices).

To facilitate communications, any of the devices shown in FIG. 1 may be operably connected to each other with communications network 130. Communications network 130 may facilitate communications with one or more wired and/or wireless networks implemented using any suitable communications technology. In one embodiment, communications network 130 may include any number and type of transmission mediums (e.g., electrical cabling, optical cabling, free space channels, etc.) through which signals (e.g., electrical, optical, etc.) on which data is encoded may be distributed amongst the devices. The communications network 130 may be implemented using any number and types of communication protocols.

Although FIG. 1 illustrates an environment and implementation in which various functionalities are performed by different devices, in some embodiments some or all of the functionalities of the inference model generator 100, inference model utilization device 120, and client devices 110A-110N may be aggregated into a single device.

Example Implementing Apparatuses

Figure 2A:
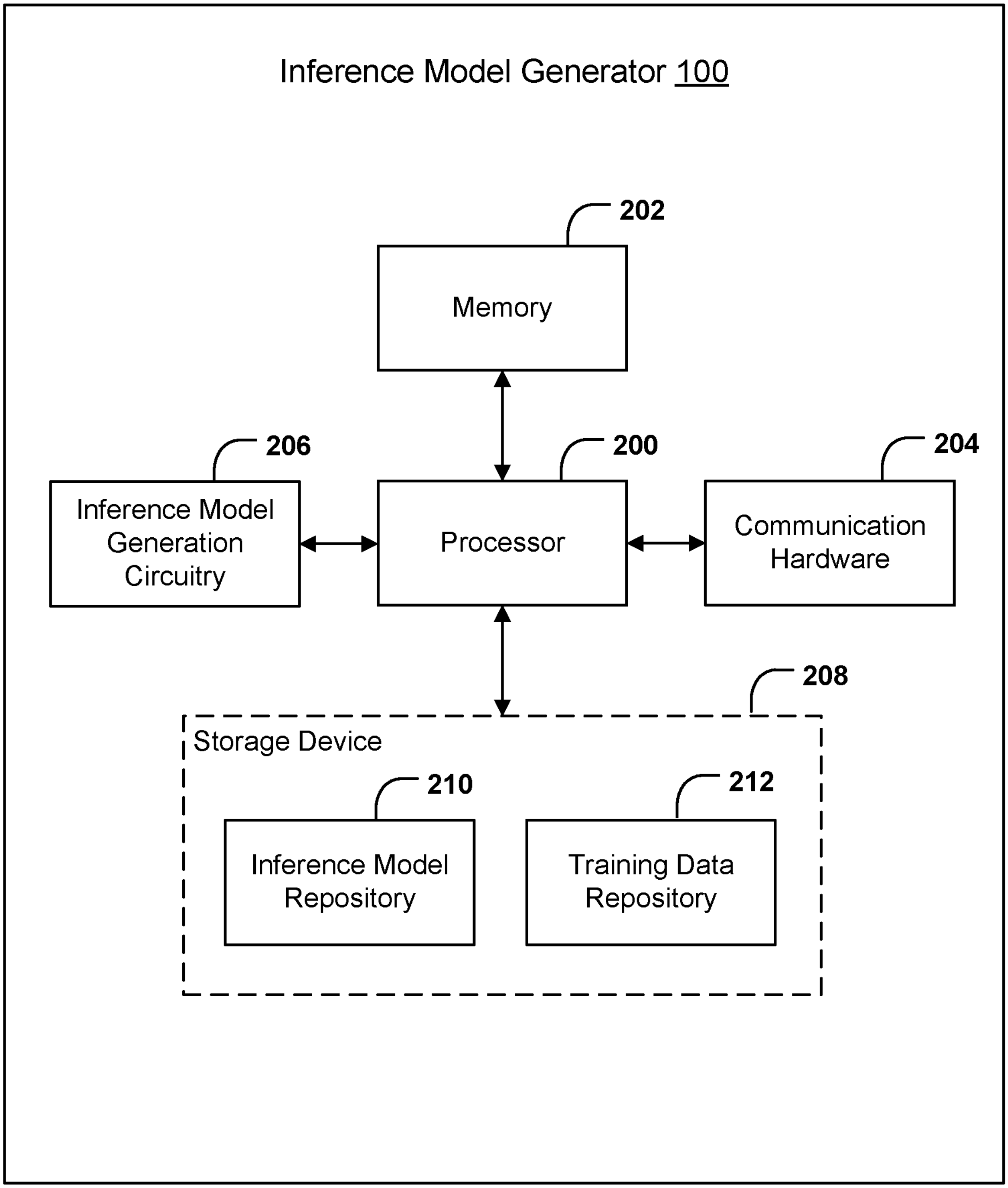
FIG. 2A illustrates a schematic block diagram of example circuitry embodying an inference model generator that may perform various operations in accordance with some embodiments described herein.

Turning to FIG. 2A, the inference model generator 100 may be embodied by one or more computing devices or servers, shown as inference model generator 100 in FIG. 2A. As illustrated in FIG. 2A, the inference model generator 100 may include processor 200, memory 202, communication hardware 204, inference model generation circuitry 206, and storage device 208, each of which will be described in greater detail below. While the various components are only illustrated in FIG. 2A as being connected with processor 200, it will be understood that the inference model generator 100 may further comprise a bus (not expressly shown in FIG. 2A) for passing information amongst any combination of the various components of the inference model generator 100. The inference model generator 100 may be configured to execute various operations described above in connection with FIG. 1 and below in connection with FIGS. 3A-3B.

The processor 200 (and/or co-processor or any other processor assisting or otherwise associated with the processor) may be in communication with the memory 202 via a bus for passing information amongst components of the apparatus. The processor 200 may be embodied in a number of different ways and may, for example, include one or more processing devices configured to perform independently.

Furthermore, the processor may include one or more processors configured in tandem via a bus to enable independent execution of software instructions, pipelining, and/or multithreading. The use of the term "processor" may be understood to include a single core processor, a multi-core processor, multiple processors of the inference model generator 100, remote or "cloud" processors, or any combination thereof.

The processor 200 may be configured to execute software instructions stored in the memory 202 or otherwise accessible to the processor (e.g., software instructions stored on a separate or integrated storage device 208). In some cases, the processor may be configured to execute hard-coded functionality. As such, whether configured by hardware or software methods, or by a combination of hardware with software, the processor 200 represents an entity (e.g., physically embodied in circuitry) capable of performing operations according to various embodiments of the present invention while configured accordingly. Alternatively, as another example, when the processor 200 is embodied as an executor of software instructions, the software instructions may specifically configure the processor 200 to perform the algorithms and/or operations described herein when the software instructions are executed.

Memory 202 is non-transitory and may include, for example, one or more volatile and/or non-volatile memories. In other words, for example, the memory 202 may be an electronic storage device (e.g., a computer readable storage medium). The memory 202 may be configured to store information, data, content, applications, software instructions, or the like, for enabling the apparatus to carry out various functions in accordance with embodiments described herein.

The communication hardware 204 may be any means such as a device or circuitry embodied in either hardware or a combination of hardware and software that is configured to receive and/or transmit data from/to a network and/or any other device, circuitry, or module in communication with the inference model generator 100. In this regard, the communications hardware 204 may include, for example, a network interface for enabling communications with a wired or wireless communication network. For example, the communications hardware 204 may include one or more network interface cards, antennas, buses, switches, routers, modems, and supporting hardware and/or software, or any other device suitable for enabling communications via a network. Furthermore, the communications hardware 204 may include the processing circuitry for causing transmission of such signals to a network or for handling receipt of signals received from a network.

In addition, inference model generator 100 further comprises inference model generation circuitry 206 configured to train inference models using training data. The inference model generator 100 may obtain training data from devices throughout a distributed system (e.g., client devices 110A-110N) and may store this training data in training data repository 212. When training inference models, the inference model generator 100 may cause inference models to be generated and/or stored in inference model repository 210. Inference model generation circuitry 206 may utilize processor 200, memory 202, or any other hardware component included in the inference model generator 100 to perform these operations, as described in connection with FIGS. 3A-3B below. The inference model generation circuitry 206 may further utilize communication hardware 204 to gather training data from a variety of sources (e.g., client devices 110A-110N or storage device 208, as shown in FIG. 1), obtain inference models for training, and in some embodiments may utilize processor 200 and/or memory 202 to obtain and store inference models following the training of inference models.

Finally, inference model generator 100 may include storage device 208 that stores data structures used by the inference model generation circuitry to provide its functionality. Storage device 208 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

As noted above, training data repository 212 may include training data usable to train a ConjNN inference model (and/or other types of inference-generation models). Training data may be obtained from various sources throughout a distributed environment (e.g., from client devices 110A-110N) and may include (all of, or a portion thereof) a set of identifying information of the clients associated with client devices 110A-110N.

For example, training data may include a set of identifying information provided by a client associated with client device 110A. The identifying information may include information such as marital status, income, credit score, number of dependents, etc. This identifying information may be temporarily or permanently stored by the inference model generator 100 for purposes of training a ConjNN inference model to make a financial viability determination regarding one or more of the clients associated with the client devices 110A-110N. It is appreciated that this is just one example, and in various other examples identifying information may be temporarily or permanently stored by the inference model generator 100 to train the ConjNN inference model to make other determinations (e.g., other determinations for one or more of the clients). Training data repository 212 may be implemented using any number and types of data structures (e.g., database, lists, tables, linked lists, etc.).

As noted above, in some examples inference model repository 210 may include copies of one or more ConjNN inference models. The ConjNN inference models may be obtained by feeding training data into an artificial neural network inference model. The ConjNN inference models may be obtained by the inference model utilization device 120 from the inference model generator 100, and used to provide computer-implemented services to clients associated with client devices 110A-110N based on the inferences provided. ConjNN inference models are further discussed herein with reference to at least FIGS. 2C-2G. Inference model repository 210 may be implemented using any number and types of data structures (e.g., database, lists, tables, linked lists, etc.).

While illustrated in FIG. 2A as being a part of inference model generator 100, the training data repository 212 and the inference model repository 210 may be stored (partially or entirely) in a different device operably connected to inference model generator 100.

Although components 200-212 are described in part using functional language, it will be understood that the particular implementations necessarily include the use of particular hardware. It should also be understood that certain of these components 200-212 may include similar or common hardware. For example, the inference model generation circuitry 206 may at times leverage use of the processor 200, memory 202, communication hardware 204, and/or storage device 208, such that duplicate hardware is not required to facilitate operation of these physical elements of the inference model generator 100 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the inference model generator 100 to perform the various functions described herein.

Although inference model generation circuitry 206 may leverage processor 200 or memory 202 as described above, it will be understood that any of these elements of inference model generator 100 may include one or more dedicated processor, specially configured field programmable gate array (FPGA), or application specific interface circuit (ASIC) to perform its corresponding functions, and may accordingly leverage processor 200 executing software stored in a memory (e.g., memory 202), or memory 202, or communication hardware 204 for enabling any functions not performed by special-purpose hardware elements. In all embodiments, however, it will be understood that the processor 200, memory 202, communication hardware 204, and storage device 208 are implemented via particular machinery designed for performing the functions described herein in connection with such elements of inference model generator 100.

In some embodiments, various components of the inference model generator 100 may be hosted remotely (e.g., by one or more cloud servers) and thus need not physically reside on the corresponding inference model generator 100. Thus, some or all of the functionality described herein may be provided by third-party circuitry. For example, a given inference model generator 100 may access one or more third-party circuitries via any sort of networked connection that facilitates transmission of data and electronic information between the inference model generator 100 and the third-party circuitries. In turn, that inference model generator 100 may be in remote communication with one or more of the other components describe above as comprising the inference model generator 100.

As will be appreciated based on this disclosure, embodiments described herein may be implemented by an inference model generator 100. Furthermore, some embodiments may take the form of a computer program product comprising software instructions stored on at least one non-transitory computer-readable storage medium (e.g., memory 202). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by inference model generator 100 as described in FIG. 2A, that loading the software instructions onto a computing device or apparatus produces a special-purpose machine comprising the means for implementing various functions described herein.

Figure 2B:
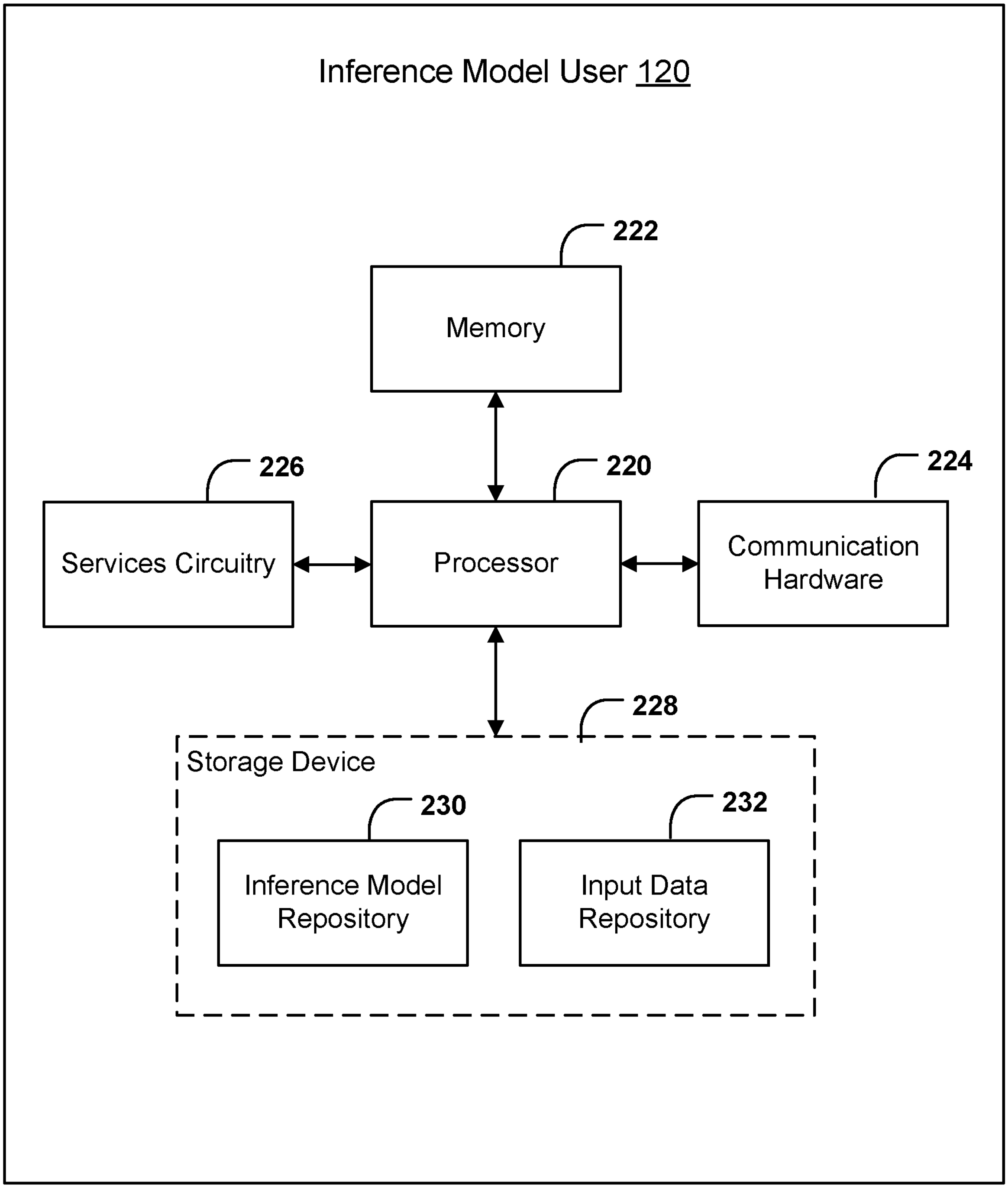
FIG. 2B illustrates a schematic block diagram of example circuitry embodying an inference model utilization device that may perform various operations in accordance with some embodiments described herein.

Turning to FIG. 2B, the inference model utilization device 120 (illustrated as "Inference Model User") may be embodied by one or more computing devices or servers, as shown in FIG. 2B. As illustrated in FIG. 2B, the inference model utilization device 120 may include processor 220, memory 222, services circuitry 226, and storage device 228, each of which will be described in greater detail below. While the various components are only illustrated in FIG. 2B as being connected with processor 220, it will be understood that the inference model utilization device 120 may further comprise a bus (not expressly shown in FIG. 2B) for passing information amongst any combination of the various components of the inference model utilization device 120. The inference model utilization device 120 may be configured to execute various operations described above in connection with FIG. 1 and below in connection with FIGS. 3A-3B.

The processor 220 (and/or co-processor or any other processor assisting or otherwise associated with the processor) may be in communication with the memory 222 via a bus for passing information amongst components of the apparatus. The processor 220 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the inference model utilization device 120, remote or "cloud" processors, or any combination thereof.

The processor 220 may be configured to execute software instructions stored in the memory 222 or otherwise accessible to the processor (e.g., software instructions stored on a separate or integrated storage device 228). In some cases, the processor may be configured to execute hard-coded functionality. As such, whether configured by hardware or software methods, or by a combination of hardware with software, the processor 220 may represent an entity (e.g., physically embodied in circuitry) capable of performing operations according to various embodiments of the present invention while configured accordingly. Alternatively, as another example, when the processor 220 is embodied as an executor of software instructions, the software instructions may specifically configure the processor 220 to perform the algorithms and/or operations described herein when the software instructions are executed.

Memory 222 is non-transitory and may include, for example, one or more volatile and/or non-volatile memories. In other words, for example, the memory 222 may be an electronic storage device (e.g., a computer readable storage medium). The memory 222 may be configured to store information, data, content, applications, software instructions, or the like, for enabling the apparatus to carry out various functions in accordance with embodiments described herein.

The communication hardware 224 may be any means such as a device or circuitry embodied in either hardware or a combination of hardware and software that is configured to receive and/or transmit data from/to a network and/or any other device, circuitry, or module in communication with inference model utilization device 120. In this regard, the communication hardware 224 may include, for example, a network interface for enabling communications with a wired or wireless communication network. For example, the communication hardware 224 may include one or more network interface cards, antennas, buses, switches, routers, modems, and supporting hardware and/or software, or any other device suitable for enabling communications via a network. Furthermore, the communication hardware 224 may include the processing circuitry for causing transmission of such signals to a network or for handling receipt of signals received from a network.

In addition, inference model utilization device 120 further comprises services circuitry 226 configured to operate ConjNN inference models (and/or other types of inference models). When operating inference models, services circuitry 226 may retrieve input data from input data repository 232 and feed the input data into a ConjNN inference model from inference model repository 230. Services circuitry 226 may make a determination, based on the inferences generated by the ConjNN inference model, regarding the computer-implemented services provided by the inference model utilization device 120. Services circuitry 226 may utilize processor 220, memory 222, or any other hardware component included in the inference model utilization device 120 to perform these operations, as described in connection with at least FIGS. 3A-3B below. The services circuitry 226 may further utilize communication hardware 224 to gather data from a variety of sources (e.g., client devices 110A-110N or storage device 228, as shown in FIG. 1), and in some embodiments, may utilize processor 220 and/or memory 222 to operate inference models to obtain inferences.

Finally, inference model utilization device 120 may include storage device 228 that stores data structures used by services circuitry 226 to provide its functionality. Storage device 228 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

As noted above, input data repository 232 may include input data usable to feed into a ConjNN inference model (and/or other types of inference models). Input data may include discontinuous data, discontinuous data including at least one discontinuity between two discrete values of the input data. For example, discontinuous data may include tabular data, tabular data being quantized values organized in a data table. Due to the quantized nature of discontinuous data, inference models may consume more computing resources in order to generate accurate inferences for discontinuous input data when compared to continuous input data. In order to increase the efficiency of inference generation for discontinuous input data, a ConjNN inference model may be implemented as discussed herein. In various examples, input data may be obtained from various sources throughout a distributed environment, such as the client devices 110A-110N illustrated in FIG. 1, and may include (all of, or a portion thereof) a set of identifying information of the clients associated with client devices 110A-110N.

For example, input data may include a set of identifying information provided by users of devices throughout a distributed system. Identifying information may include information such as marital status, income, credit score, number of dependents, etc., and may include quantized data organized in a data table (e.g., tabular data). This identifying information may be temporarily or permanently stored by the inference model utilization device 120 for purposes of feeding into a ConjNN inference model (and/or other types of inference models) to make financial viability determinations (or other determinations) regarding one or more clients associated with client devices 110A-110N (and/or other purposes). Input data repository 232 may be implemented using any number and types of data structures (e.g., database, lists, tables, linked lists, etc.).

As noted above, inference model repository 230 may include one or more ConjNN inference models. The ConjNN inference models may be obtained by feeding training data into an artificial neural network inference model. The ConjNN inference models may be obtained by the inference model utilization device 120 from the inference model generator 100 and used to provide computer-implemented services to clients associated with client devices 110A-110N, based on the inferences. ConjNN inference models are further discussed herein with reference to at least FIGS. 2C-2G. Inference model repository 210 may be implemented using any number and types of data structures (e.g., database, lists, tables, linked lists, etc.).

While illustrated in FIG. 2B as being a part of inference model utilization device 120, the input data repository 232 and the inference model repository 230 may be stored (partially or entirely) in a different device operably connected to inference model utilization device 120.

Although components 220-232 are described in part using functional language, it will be understood that the particular implementations necessarily include the use of particular hardware. It should also be understood that certain of these components 220-232 may include similar or common hardware. For example, the services circuitry 226 may at times leverage use of the processor 220, memory 222, communication hardware 224, and/or storage device 228, such that duplicate hardware is not required to facilitate operation of these physical elements of the inference model utilization device 120 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the inference model utilization device 120 to perform the various functions described herein.

Although services circuitry 226 may leverage processor 220 or memory 222 as described above, it will be understood that any of these elements of inference model utilization device 120 may include one or more dedicated processor, specially configured field programmable gate array (FPGA), or application specific interface circuit (ASIC) to perform its corresponding functions, and may accordingly leverage processor 220 executing software stored in a memory (e.g., memory 222), or memory 222, or communication hardware 224 for enabling any functions not performed by special-purpose hardware elements. In all embodiments, however, it will be understood that the processor 220, memory 222, communication hardware 224, and storage device 228 are implemented via particular machinery designed for performing the functions described herein in connection with such elements of inference model utilization device 120.

In some embodiments, various components of the inference model utilization device 120 may be hosted remotely (e.g., by one or more cloud servers) and thus need not physically reside on the corresponding inference model utilization device 120. Thus, some or all of the functionality described herein may be provided by third-party circuitry. For example, a given inference model utilization device 120 may access one or more third-party circuitries via any sort of networked connection that facilitates transmission of data and electronic information between the inference model utilization device 120 and the third-party circuitries. In turn, that inference model utilization device 120 may be in remote communication with one or more of the other components describe above as comprising the inference model utilization device 120.

As will be appreciated based on this disclosure, embodiments described herein may be implemented by an inference model utilization device 120. Furthermore, some embodiments may take the form of a computer program product comprising software instructions stored on at least one non-transitory computer-readable storage medium (e.g., memory 222). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by inference model utilization device 120 as described in FIG. 2B, that loading the software instructions onto a computing device or apparatus produces a special-purpose machine comprising the means for implementing various functions described herein.

Example Conjoined Neural Networks

Figure 2C:
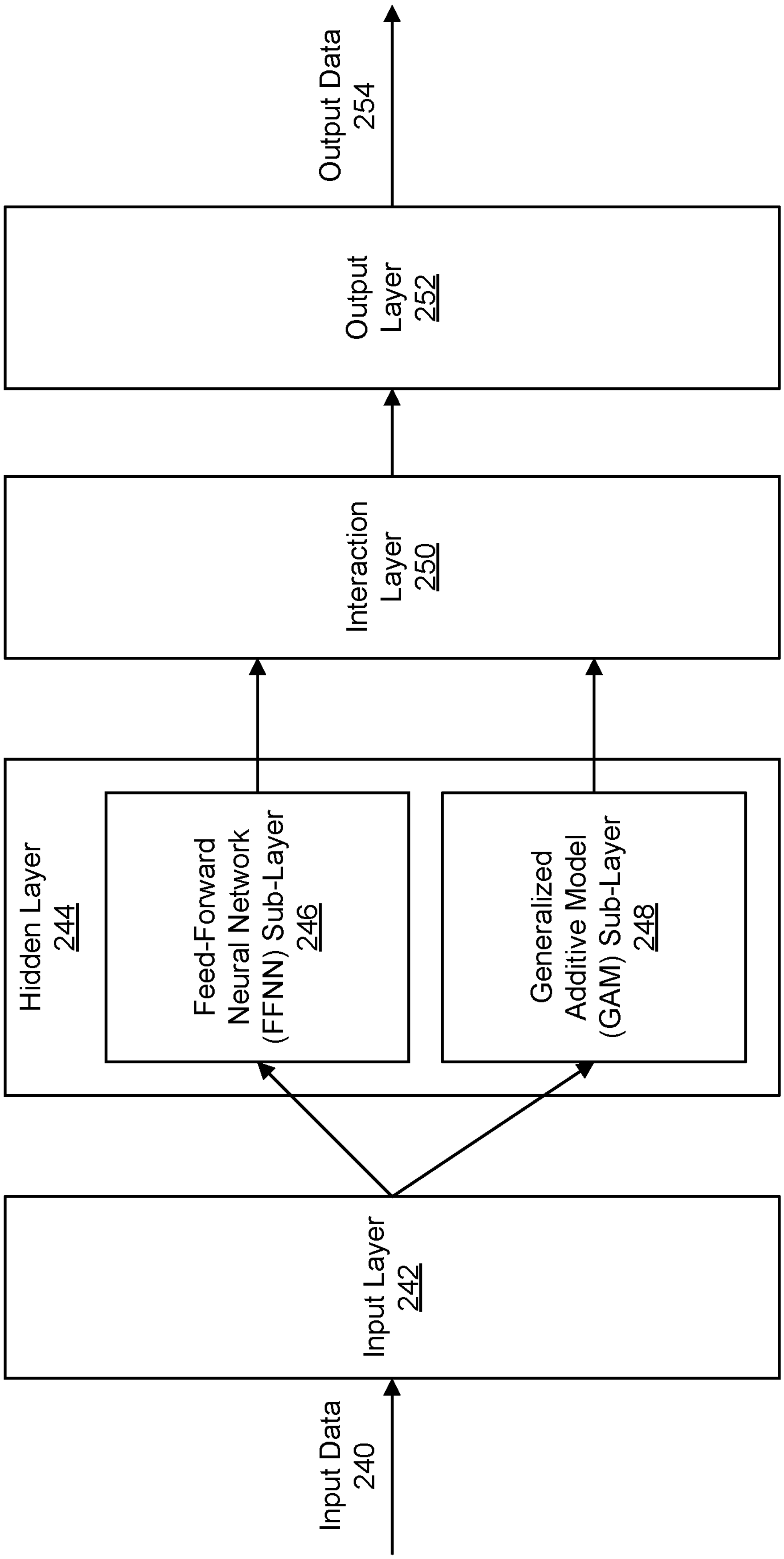
FIG. 2C illustrates a schematic block diagram of a conjoined neural network inference model in accordance with some embodiments described herein.

Turning to FIGS. 2C-2G, with continuing reference to at least FIG. 1, these figures may illustrate examples of ConjNN architectures usable by components of the system in FIG. 1. FIG. 2C illustrates an example ConjNN inference model, while FIGS. 2D-2G illustrate example components of the ConjNN inference model shown in reference to FIG. 2C. ConjNN inference models and components of ConjNN inference models may include other architectures without departing from embodiments disclosed herein.

Turning to FIG. 2C, a diagram of an example of a ConjNN inference model in accordance with an embodiment is shown. A ConjNN inference model may include an input layer 242, a hidden layer 244, an interaction layer 250, and an output layer 252, each of which will be described in greater detail below.

Input data 240 may include any data obtained from client devices 110A-110N and stored in input data repository 232. The input data 240 may include identifying information of a client associated with client devices 110A-110N (e.g., marital status, number of dependents, credit score, income, etc.). Input data 240 may include discontinuous data, discontinuous data being divided by at least one discontinuity. Each discontinuity may divide the input data 240 into two sub-ranges that each converge to different points near the discontinuity.

Input data 240 may be fed into an input layer 242 of the ConjNN inference model. The input layer 242 may organize the input data prior to projecting the input data 240 onto the hidden layer 244 of the ConjNN inference model. The input data may be projected by the input layer 242 onto the two sub-layers of the hidden layer 244 of the ConjNN inference model. The first sub-layer of the two sub-layers may be a feed-forward neural network (FFNN) sub-layer 246. The second sub-layer of the two sub-layers may be a generalized additive model (GAM) sub-layer 248. Additional details regarding the FFNN sub-layer 246 and GAM sub-layer 248 are discussed herein with reference to at least FIGS. 2D-2G.

The two sub-layers 246 and 248 of the hidden layer 244 may each generate a plurality of intermediate outputs, the two respective pluralities of intermediate outputs comprising a first plurality of intermediate outputs generated by the FFNN sub-layer 246 and a second plurality of intermediate outputs generated by the GAM sub-layer 248. The FFNN sub-layer and GAM sub-layer may each utilize regularization (e.g., L1 regularization and/or dropout regularization, etc.), which are described in more detail below in reference to FIGS. 4A-4C. The two pluralities of intermediate outputs may then be projected onto the interaction layer 250.

The interaction layer 250 may combine the two pluralities of intermediate outputs by performing a multiplicative nonlinear transformation to obtain a plurality of values of the elements of the interaction layer 250. The plurality of values of the elements of the interaction layer 250 may then be projected, by the interaction layer 250, on the output layer 252 of the ConjNN inference model. The output layer 252 may then generate output data using the plurality of values. Regularization (e.g., L1 regularization and/or dropout regularization, etc.) may also be implemented in the output layer 252. In some examples, regularization implemented in the output layer 252 may be advantageous to avoid over-fitting of the data. Applying regulation to the ConjNN framework (e.g., in the FFNN sub-layer, in the GAM sub-layer, and/or in the Output layer) reduces a parameter count of trained networks, which in turn advantageously decreases storage requirements and improves computational performance of inference without compromising a model's accuracy.

Output data may determine the number and/or type of computer-implemented services to provide to clients associated with client devices 110A-110N. For example, output data may include a determination regarding whether to extend a line of credit to a client associated with a client device. In a second example, output data may include parameters such as the amount of credit extended to the client associated with the client device. Based on the output data, the inference model utilization device 120 may make a financial viability determination regarding the client associated with the client device. Based on the financial viability determination, the inference model utilization device 120 may extend a financial product offer to the client associated with the client device.

A ConjNN inference model may generate accurate inferences for discontinuous input data due to the conjoined architecture of the hidden layer 244 of the ConjNN inference model. Utilizing a conjoined architecture may improve the trainability of inference models for use with discontinuous input data. Co-training the FFNN sub-layer 246 and the GAM sub-layer 248 using continuous input data, and combining the two pluralities of intermediate outputs, may highly incentivize the ConjNN to generate accurate output data 254. By highly incentivizing the generation of accurate output data 254 during the training of the ConjNN inference model, the trained ConjNN inference model may be less susceptible to generating undesirable output data 254 due to discontinuities in input data 240.

As mentioned previously, a ConjNN architecture may include two sub-layers 246 and 248 in the hidden layer 244 of the ConjNN artificial neural network. A first sub-layer of the two sub-layers may be a FFNN sub-layer 246 and a second sub-layer of the two sub-layers may be a GAM sub-layer 248. The FFNN sub-layer 246 and GAM sub-layer 248 may include different artificial neural network architectures depending on the implementation of the ConjNN. Turning to FIGS. 2D-2G, example ConjNN sub-layer architectures are shown, including two example FENN sub-layer architectures and two GAM sub-layer architectures. Each sub-layer architecture will be described in detail below.

Figure 2D:
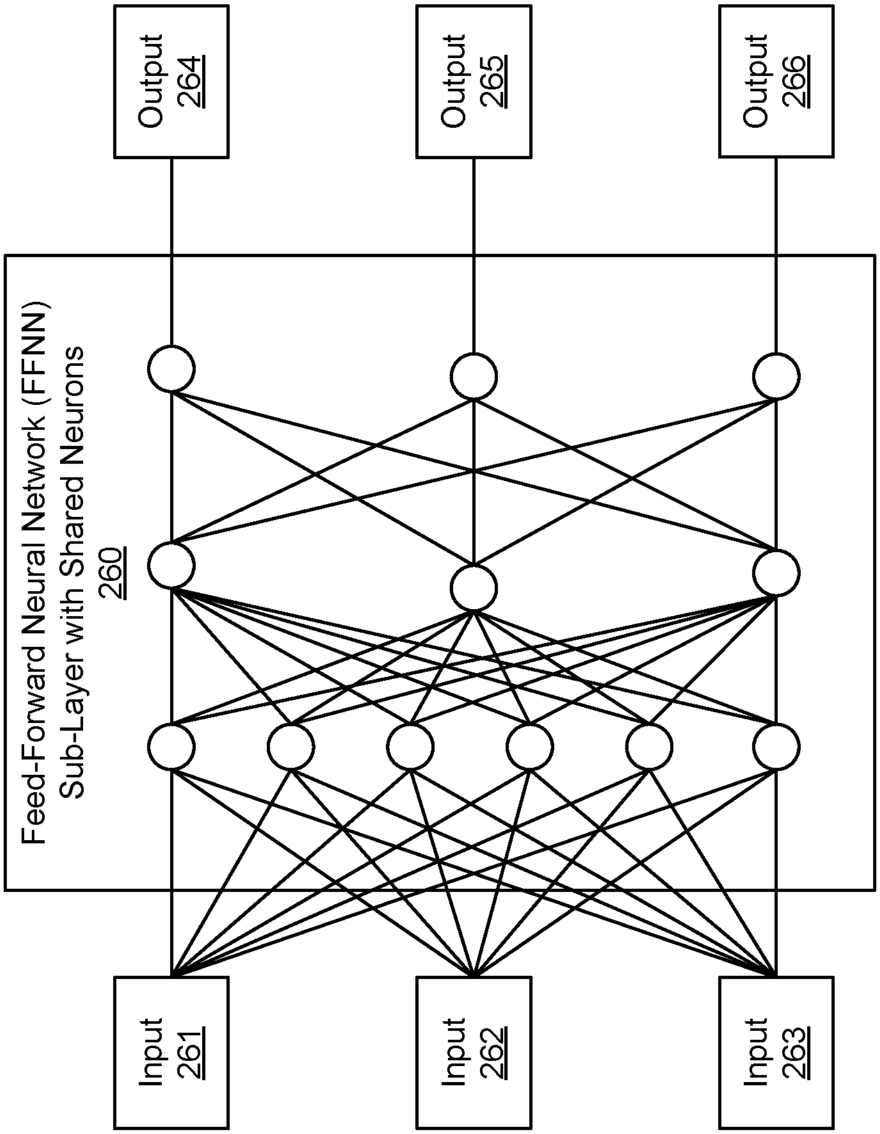
FIG. 2D illustrates a schematic block diagram of a feed-forward neural network sub-layer with shared neurons in accordance with some embodiments described herein.

Turning to FIG. 2D, a diagram of an example architecture for a FFNN sub-layer 246 in accordance with an embodiment is shown. In an embodiment, the FFNN sub-layer 246 may be configured as a FFNN sub-layer with shared neurons 260. In a FFNN sub-layer with shared neurons 260, each of the values of the first layer of neurons (represented by the left most column of circles) may depend on all of the inputs 261-263 (e.g., the data represented by the arrow from input layer 242 to FFNN sub-layer 246 shown in FIG. 2C). Similarly, each of the values of the second layer of neurons (represented by the middle column of circles) may depend on one or more of the values of the first layer of neurons. This pattern may continue with each of the values of the neurons in the third layer of neurons potentially depending on one or more of the values of the second layer of neurons. Outputs 264-266 may be determined based on the values of the third layer of neurons.

Figure 2E:
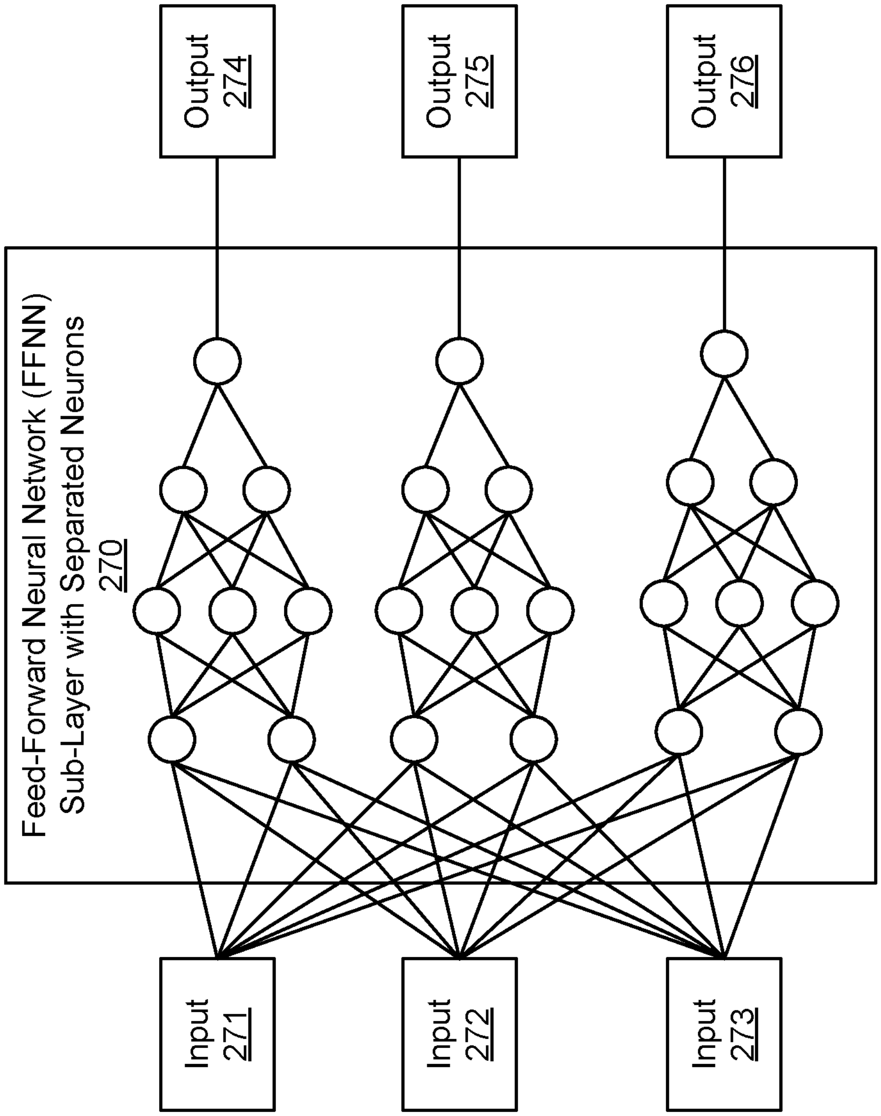
FIG. 2E illustrates a schematic block diagram of a feed-forward neural network sub-layer with separated neurons in accordance with some embodiments disclosed herein.

Turning to FIG. 2E, a diagram of an example architecture for a FFNN sub-layer 246 in accordance with an embodiment is shown. In an embodiment, the FFNN sub-layer 246 may be configured as a FFNN sub-layer with separated neurons 270. In a FFNN sub-layer with separated neurons 270, each of the values of the first layer of neurons (represented by the left most column of circles) may depend on all of the inputs 271-273 (e.g., the data represented by the arrow from input layer 242 to FFNN sub-layer 246 shown in FIG. 2C). Each of the values of the second layer of neurons may depend on a portion (e.g., some, but not all) of the values of the first layer of neurons. Similarly, each of the values of the third layer of neurons may depend on a portion (e.g., some, but not all) of the second layer of neurons, and each of the values of the fourth layer of neurons may depend on a portion (e.g., some, but not all) of the third layer of neurons. Each portion of neurons may generate an output value. Therefore, output 274 may depend on a value of a first portion of neurons, output 275 may depend on a value of a second portion of neurons, and output 276 may depend on a value of a third portion of neurons.

Figure 2F:
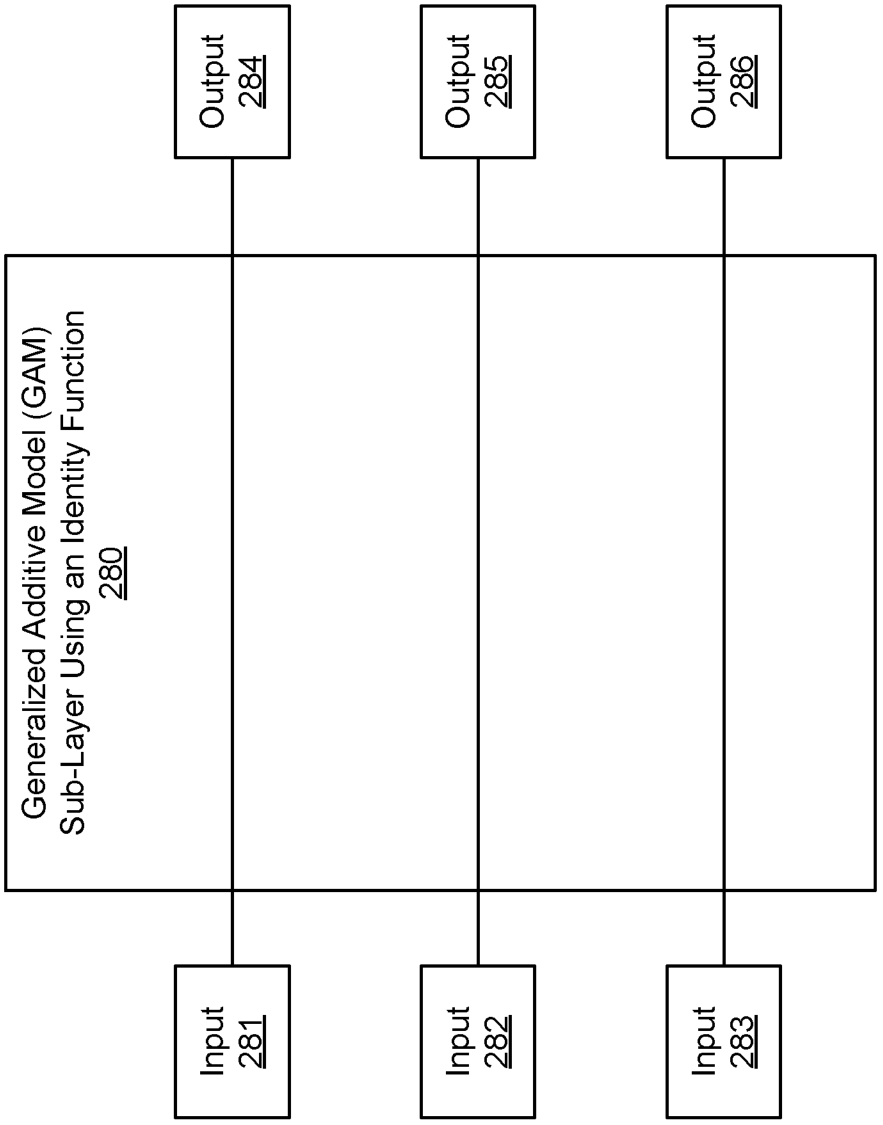
FIG. 2F illustrates a schematic block diagram of a generalized additive model sub-layer using an identity function in accordance with some embodiments disclosed herein.

Turning to FIG. 2F, a diagram of an example architecture for a GAM sub-layer 248 in accordance with an embodiment is shown. In an embodiment, the GAM sub-layer 248 may be configured as a GAM sub-layer using an identity function 280. In a GAM sub-layer using identity function 280, each of the inputs 281-283 may pass unaltered through the GAM sub-layer 248. Therefore, input 281 may be identical to output 284, input 282 may be identical to output 285, and input 283 may be identical to output 286.

Figure 2G:
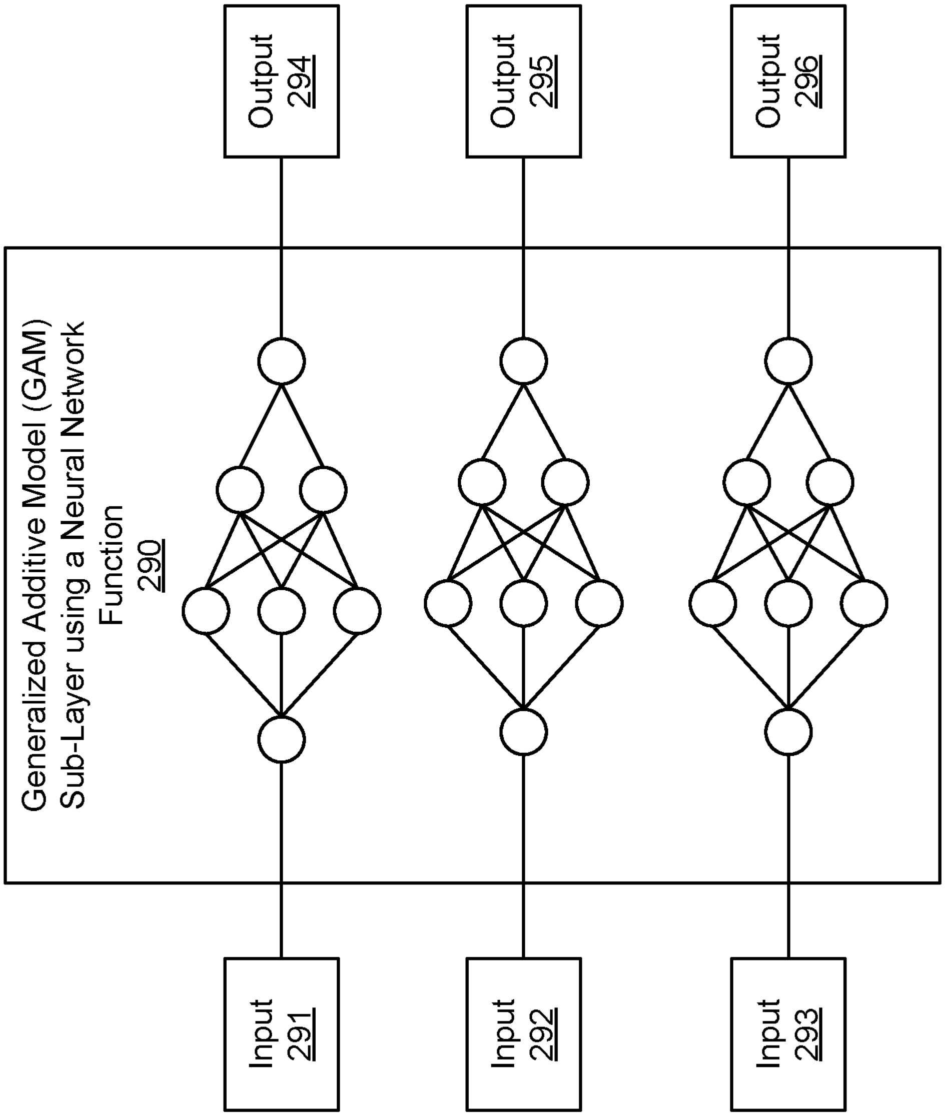
FIG. 2G illustrates a schematic block diagram of a generalized additive model sub-layer using a neural network function in accordance with some embodiments disclosed herein.

Turning to FIG. 2G, a diagram of an example architecture for the GAM sub-layer 248 in accordance with an embodiment is shown. In an embodiment, the GAM sub-layer 248 may be configured as a GAM sub-layer using a neural network function 290. The GAM sub-layer using a neural network function 290 may include any neural network architecture. In a first example, each of the values of the first layer of neurons (represented by the left most column of circles) may depend on one of the inputs 291-293. Subsequent layers of neurons may be divided into portions of neurons, each input value being projected on one portion of neurons and each output value depending on one portion of neurons. The values of the neurons in each portion of neurons in the second layer of neurons may depend on one neuron from the first layer of neurons. The values of the neurons in the third layer of neurons may depend on the neurons in the second layer of neurons associated with the same portion of neurons. Similarly, the values of the neurons in the fourth layer of neurons may depend on the neurons in the third layer of neurons associated with the same portion of neurons. Each portion of neurons may generate an output value. Therefore, output 294 may depend on a value of a first portion of neurons, output 295 may depend on a value of a second portion of neurons, and output 296 may depend on a value of a third portion of neurons.

In a second example, each of the values of the first layer of neurons may depend on all of the inputs 291-293 (not shown in FIG. 2G). In this example, the subsequent neural network architecture may utilize shared neurons (similar to the architecture shown in FIG. 2D) or separated neurons (similar to the architecture shown in FIG. 2E). The GAM sub-layer using a neural network function 290 may include other types of neural network architectures without departing from embodiments disclosed herein.

Example Apparatus Operations for Inference Generation

Figure 3A:
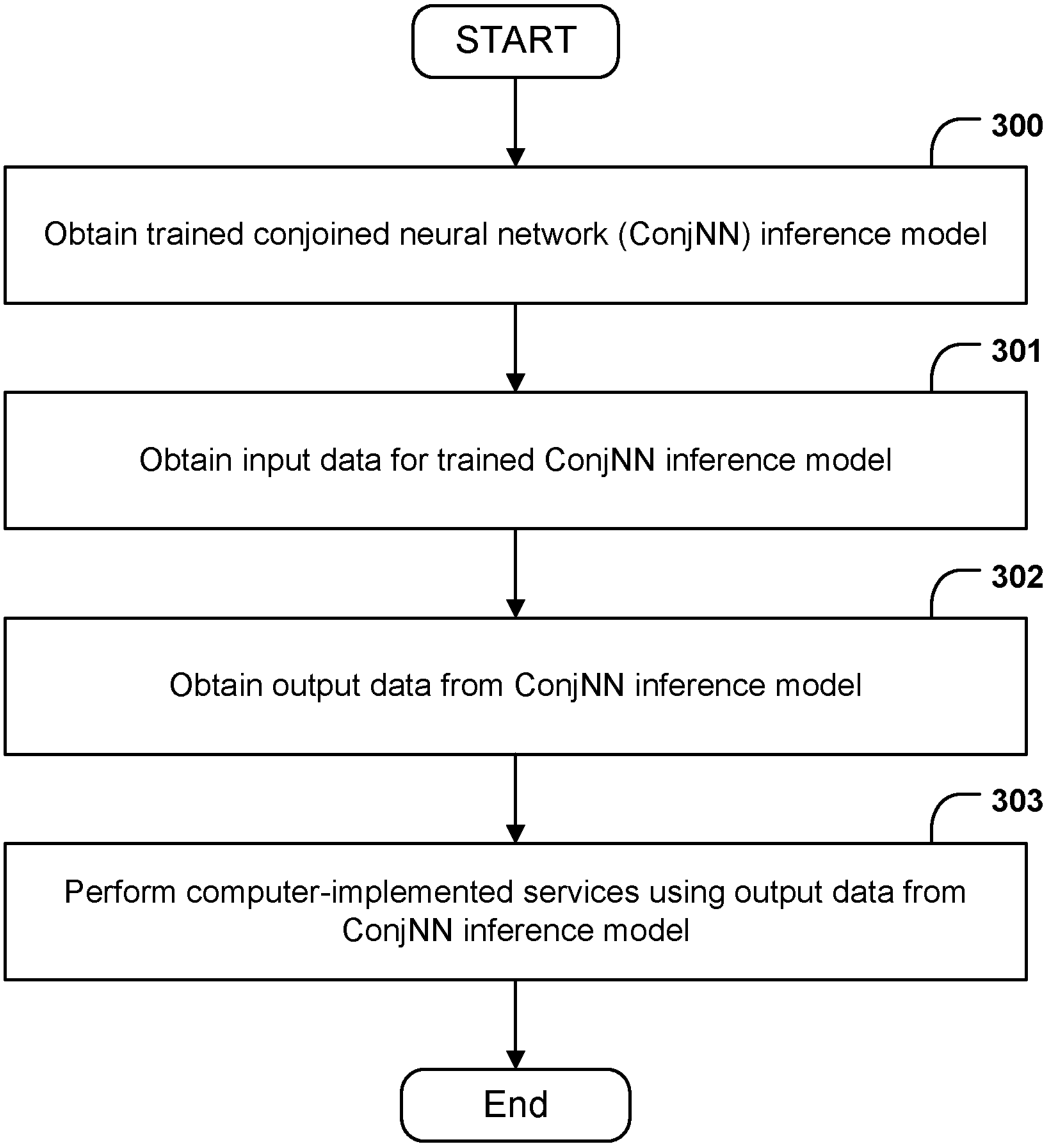
FIG. 3A illustrates an example flowchart for utilizing a conjoined neural network inference model to facilitate the performance of computer-implemented services, in accordance with some embodiments described herein.
Figure 3B:
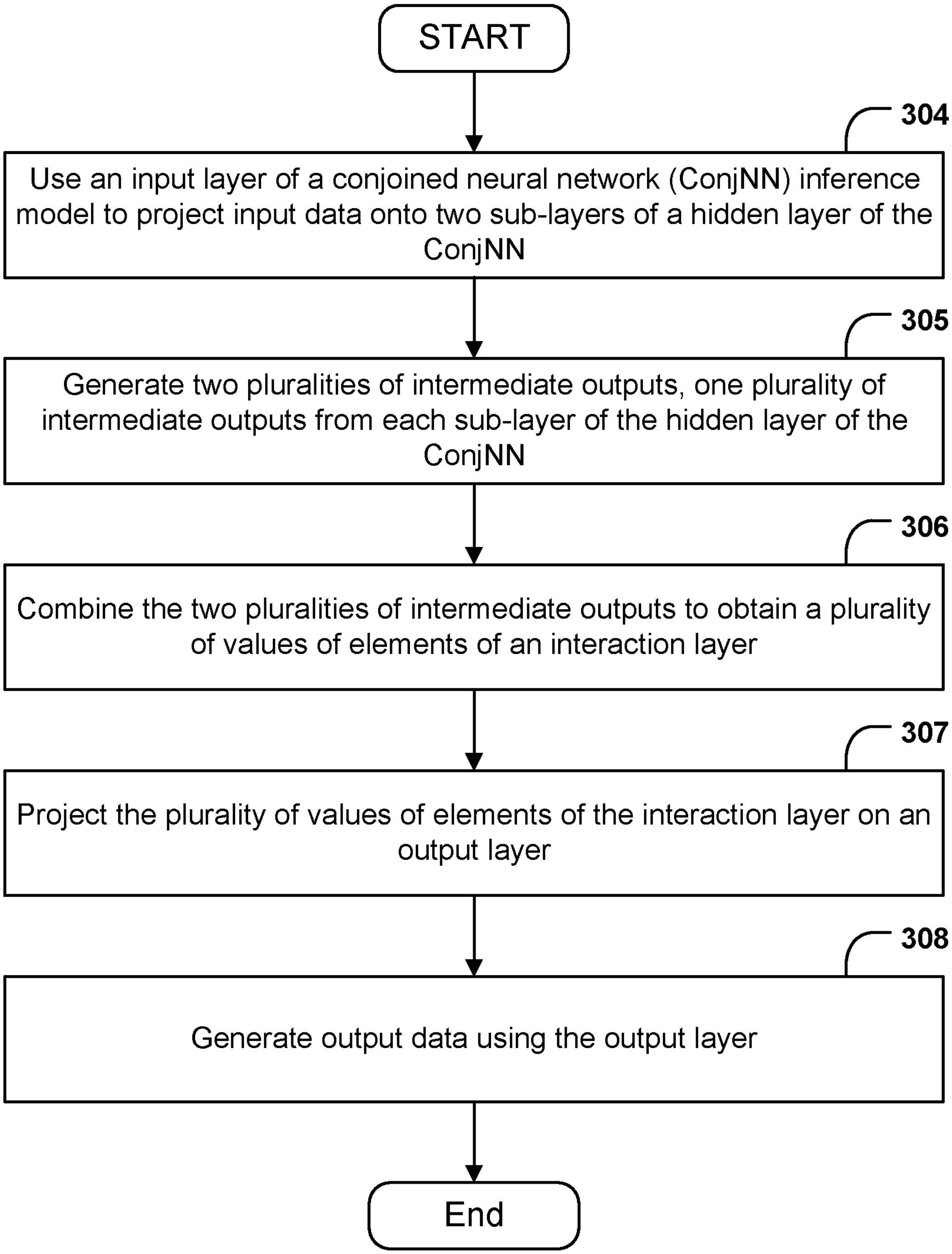
FIG. 3B illustrates an example flowchart for generating output data using a conjoined neural network inference model, in accordance with some embodiments described herein.

Turning to FIGS. 3A-3B, example flowcharts are illustrated that include example operations implemented by various embodiments described herein. FIGS. 3A-3B illustrate example operations for obtaining inferences using a ConjNN inference model.

The operations illustrated in FIGS. 3A and 3B may, for example, be performed by inference model utilization device 120 shown in FIG. 1, and which is also shown and described in connection with FIG. 2B. To perform the operations described below, the inference model utilization device 120 may utilize one or more of processor 220, memory 222, communication hardware 224, services circuitry 226, storage device 228, and/or any combination thereof.

Turning first to FIG. 3A, example operations are shown for obtaining inferences (e.g. output data) via a ConjNN inference model and performing computer-implemented services based on the output data.

As shown by operation 300, the inference model utilization device 120 includes means, such as a services circuitry, or the like, for obtaining a trained ConjNN inference model. To host and operate a ConjNN inference model, inference model utilization device 120 may obtain a trained ConjNN inference model from the inference model generator 100. The inference model utilization device 120 may obtain the trained ConjNN inference model via a communications network 130 as shown in FIG. 1. The inference model utilization device 120 and inference model generator 100 may be integrated into the same device, thereby allowing the device to both train and operate ConjNN inference models.

As shown by operation 301, the inference model utilization device 120 includes means, such as services circuitry, or the like, for obtaining input data for the trained ConjNN inference model. The input data (e.g., from input data repository 232) may be obtained from client devices 110A-110N. The input data may include identifying information (e.g., marital status, credit score, number of dependents, income, etc.) of a client associated with one of the client devices 110A-110N and may be used to determine whether to extend a financial product offer to the client, and/or for other purposes. The input data may include discontinuous data and may comprise values that range over a discontinuous data range, the discontinuous data range comprising at least one discontinuity between two discrete values. The input data may include tabular data (e.g., quantized values organized in a data table) and may be represented by a discontinuous function (e.g., a step function). For example, the input data may include the following information of a user associated with client device 110A: <marital status: married, number of dependents: 0, credit score: 720, income: $75,000>.

As shown by operation 302, the inference model utilization device 120 includes means, such as services circuitry, or the like, for obtaining output data from the ConjNN inference model. Output data may be obtained by feeding input data into a ConjNN inference model. The ConjNN may generate output data based on the input data. For additional details regarding how the ConjNN inference model generates the output data, refer to FIG. 3B.

The output data may include or indicate a determination regarding the number and types of computer-implemented services to provide to the clients associated with the client devices 110A-110N. In a first example, output data may be obtained from a ConjNN inference model hosted and operated by the inference model utilization device 120. In a second example, the output data may be obtained from another entity (e.g., another inference model utilization device) in order to determine the number and types of computer-implemented services to provide to the clients associated with the client devices 110A-110N.

Continuing with the above example regarding input data, the input data associated with a client (e.g., a client associated with client device 110A)<marital status: married, number of dependents: 0, credit score: 720, income: $75,000> may be fed into a trained ConjNN. The ConjNN may be trained to make a determination regarding whether to extend a line of credit to the client associated with the client device 110A. The determination may be to extend a line of credit to the client associated with the client device 110A and, therefore, the output data may include this determination.

As shown by operation 303, the inference model utilization device 120 includes means, such as services circuitry, or the like, for performing computer-implemented services using the output data from a ConjNN inference model. The computer-implemented services may be provided using the output data by performing actions based on the content of the output data. For example, the output data may be stored in memory, used to obtain other information (e.g., via computation), may be used to control programmatic flow of applications, and/or may be otherwise used by applications or other entities that provide the computer-implemented services.

The computer-implemented services may include, for example, making a financial viability determination regarding at least one of the clients associated with the client devices 110A-110N and extending a financial product offer to at least one of the clients associated with the client devices based on the financial viability determination. The quantity and/or type of financial product offer may be based on the output data (e.g., the inference) obtained from the inference model. Continuing with the above example, the financial product offer may be the line of credit and the inference model utilization device may extend the new line of credit to the client associated with the client device (e.g., via an application hosted by the inference model utilization device that makes financial product offer decisions).

The operation may end following operation 303.

Turning to FIG. 3B, example operations are shown for obtaining inferences utilizing a ConjNN inference model by an inference model utilization device 120. For example, an inference model utilization device 120 may obtain input data from client devices 110A-110N (and/or other sources). The inference model utilization device 120 may feed the input data into the ConjNN inference model to obtain an inference. The operations shown in FIG. 3B may be an expansion of operation 302 in FIG. 3A.

As shown by operation 304, the inference model utilization device 120 includes means, such as services circuitry, or the like, for using an input layer of a ConjNN inference model to project input data onto two sub-layers of a hidden layer of the ConjNN. The input layer may consist of any number of neurons. The input layer may be responsible for actions such as grouping the data, passing the data to the neurons in the hidden layer of the ConjNN, and/or other actions. The input layer may project the input data on each of the two sub-layers of the hidden layer of the ConjNN.

As shown by operation 305, the inference model utilization device includes means, such as services circuitry, or the like, for generating two pluralities of intermediate outputs, one plurality of intermediate outputs from each sub-layer of the hidden layer of the ConjNN. The hidden layer of the ConjNN may include a first sub-layer and a second sub-layer. The first sub-layer may include a FFNN sub-layer. In a first example, the FFNN sub-layer may include a shared-neuron architecture. In a second example, the FFNN sub-layer may include a separated neuron architecture. The second sub-layer may include a GAM sub-layer. In a first example, the GAM sub-layer may include an identity function architecture. In a second example, the GAM sub-layer may include a neural network function architecture. The hidden layer may include any combination of the previously mentioned FFNN sub-layer and GAM sub-layer architectures to obtain the two pluralities of intermediate outputs. In some embodiments, regularization (e.g., L1 regularization, dropout regularization, etc.) may be implemented in one or more sublayers (the FFNN sub-layer and/or the GAM sub-layer) to simplify the parameters of the sub-layer, stabilize numerical estimation, and avoid over-fitting of data. The effects of applying L1 regularization and dropout regularization to the data (e.g., test data and training data) are shown in more detail below in reference to FIGS. 4A-4C.

As shown by operation 306, the inference model utilization device includes means, such as services circuitry, or the like, for combining the two pluralities of intermediate outputs to obtain a plurality of values of elements of an interaction layer. Combining the two pluralities of intermediate outputs may include performing a multiplicative non-linear transformation to obtain the plurality of values. The plurality of values may be obtained via other methods without departing from embodiments disclosed herein.

As shown by operation 307, the inference model utilization device includes means, such as services circuitry, or the like, for projecting the plurality of values of elements of the interaction layer on an output layer. The output layer may contain any number of neurons and the values of the neurons in the output layer may depend on the neurons in the interaction layer.

As shown by operation 308, the inference model utilization device includes means, such as services circuitry, or the like, for generating output data using the output layer. Generating output data may include performing any mathematical operation on the plurality of values of elements of the interaction layer to determine the final output values of the ConjNN. Similar to operation 304, regularization (e.g., L1 regularization, dropout regularization, etc.) also be implemented to the output layer.

Output data may be used to determine the type and/or quantity of computer-implemented services provided to client devices 110A-110N.

The method may end following operation 308.

FIGS. 3A-3B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example Data with Regularization

Figure 4A:
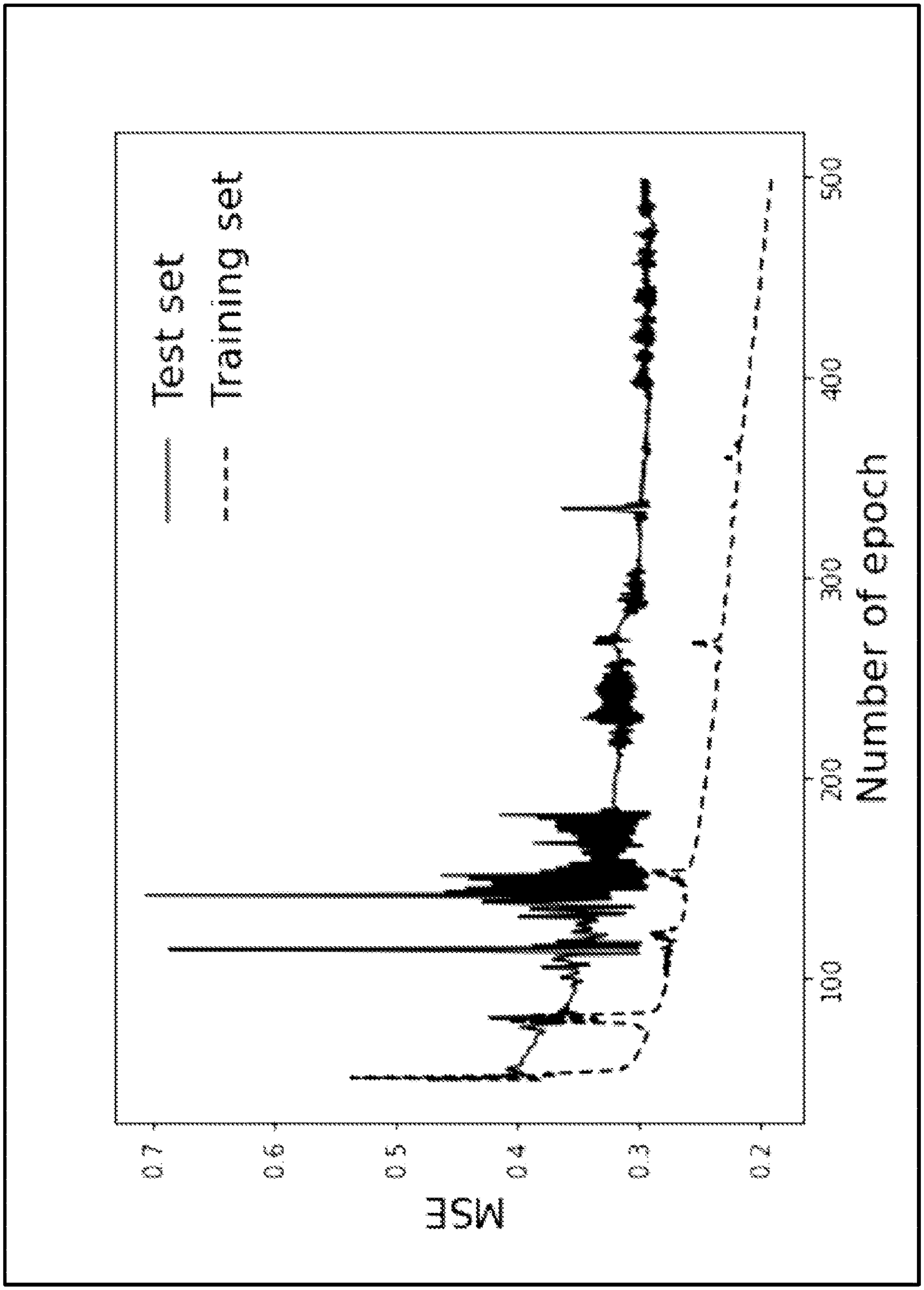
FIG. 4A illustrates example training and test data with no regularization, in accordance with some embodiments described herein.
Figure 4B:
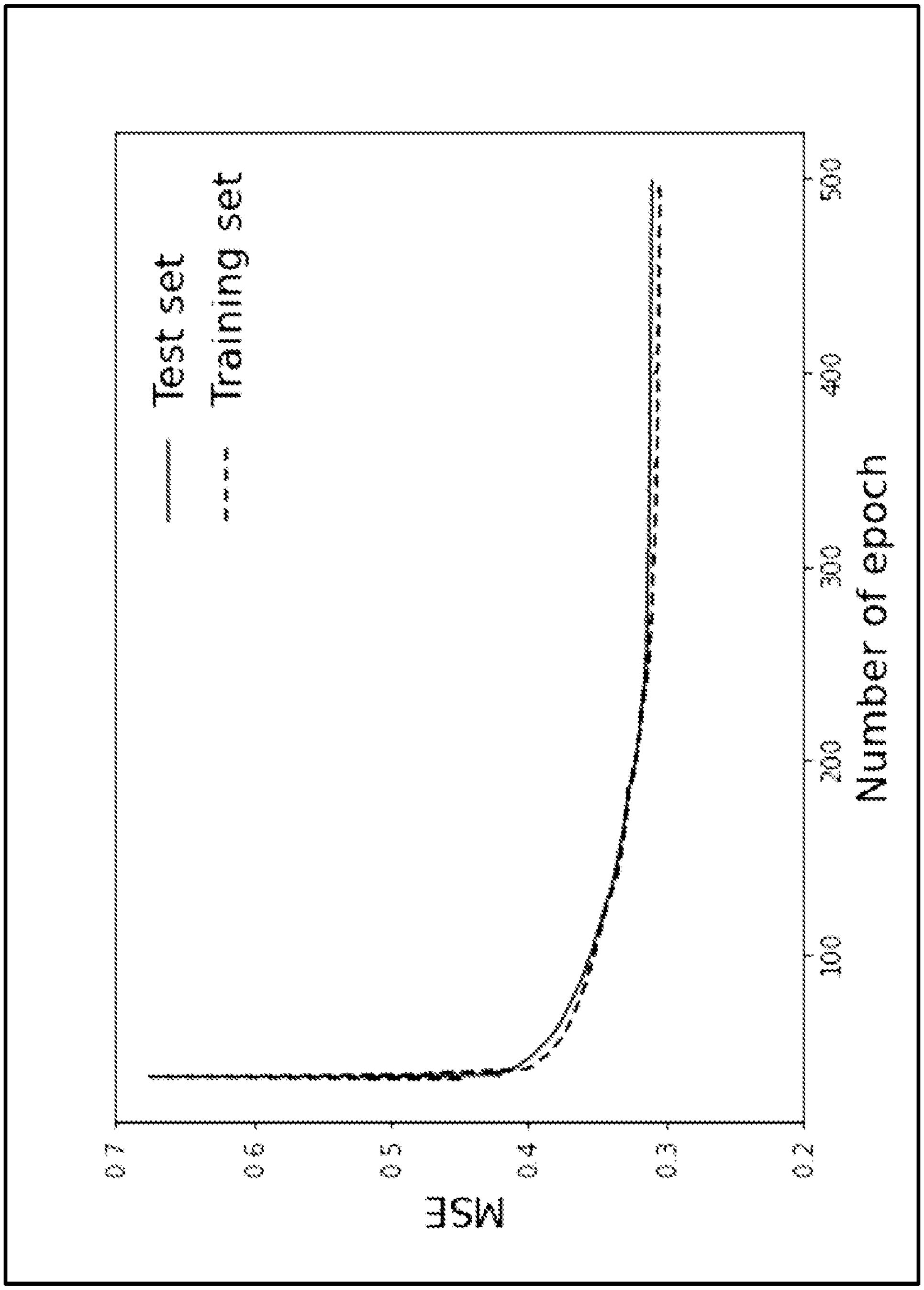
FIG. 4B illustrates L1 regularization being applied to the example training and test data of FIG. 4A.
Figure 4C:
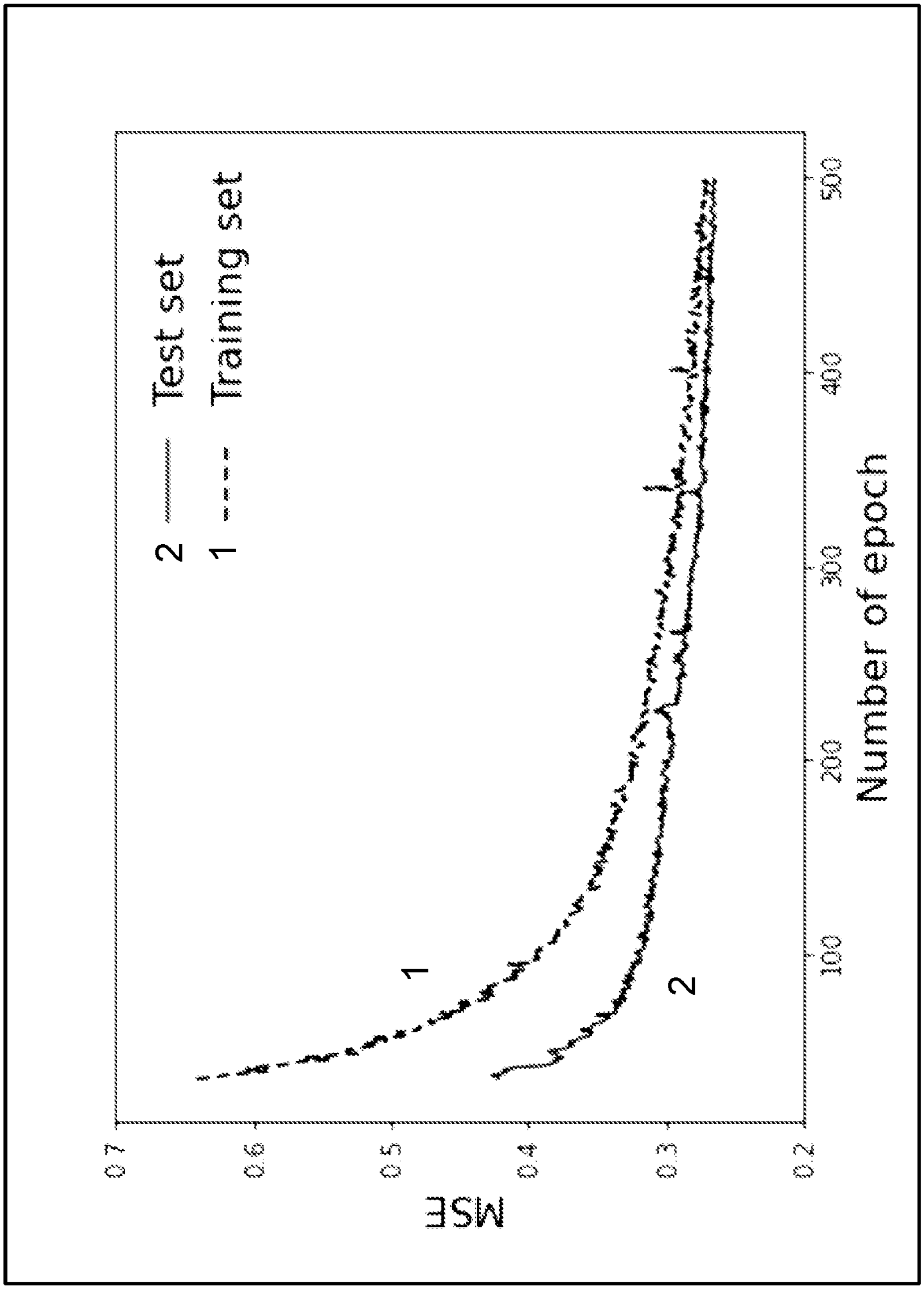
FIG. 4C illustrates dropout regularization being applied to the example training and test data of FIG. 4A.

As previously mentioned, regularization may be applied to the sub-layers of the hidden layer and the output layer of the ConjNN. Applying regularization (e.g., L1 regulation and/or dropout regularization) to these layers advantageously may prevent overfitting of data and generalize the ConjNN, which may result in more accurate inferences when analyzing new data. In addition, regularization simplifies the parameter count of the ConjNN and, therefore, decreases the computational overhead required to host and operate the ConjNN, which directly improves the functionality of the computing device(s) executing the ConjNN. FIGS. 4A-4C illustrate training and test data with and without application of regularization.

In particular, FIG. 4A illustrates example training set data and test set data with no regularization applied. As can be seen in FIG. 4A, without regularization, the peaks in the training set have generated noise in the test set. When compared to FIG. 4A, FIGS. 4B and 4C illustrate the potential benefits of regularization. As shown by FIGS. 4B and 4C, regularization smoothens (i.e., no peaks) the features of the training set data and, therefore, reduces noise in the test set data. In particular, FIG. 4B illustrates an example where L1 regularization is applied to the same training set data and test set data shown in FIG. 4A. FIG. 4C illustrates an example where dropout regularization is applied to the same training set data and test set data shown in FIG. 4A. Each sub-layer of the hidden layer and the output layer may implement L1 and/or dropout regularization as needed for flexibility of the ConjNN.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for obtaining inferences using inference models, the method comprising:
- obtaining, by circuitry of an inference model utilization device, an inference model, the inference model comprising a conjoined neural network inference model;
- obtaining, by communication hardware of the inference model utilization device and from at least one client associated with at least one client device, input data for the conjoined neural network inference model;
- obtaining, by services circuitry of the inference model utilization device and using the input data, output data from the conjoined neural network inference model, wherein obtaining the output data from the conjoined neural network inference model includes:
  - projecting, by an input layer of the conjoined neural network inference model, the input data onto two sub-layers of a hidden layer of the conjoined neural network inference model;
  - generating, by the two sub-layers of the hidden layer of the conjoined neural network inference model, two pluralities of intermediate outputs comprising a first plurality of intermediate outputs generated by a first of the two sub-layers and a second plurality of intermediate outputs generated by a second of the two sub-layers;
  - combining, by an interaction layer of the conjoined neural network inference model, the two pluralities of intermediate outputs to obtain a plurality of values of elements of the interaction layer;
  - projecting, by the interaction layer, the plurality of values of the elements of the interaction layer on an output layer of the conjoined neural network inference model; and
  - generating, by the output layer and using the projected plurality of values, the output data; and
- providing, at least in part by the communication hardware and to the at least one client associated with the at least one client device, computer-implemented services using the output data.

2. The method of claim 1, wherein the first of the two sub-layers comprises a feed-forward neural network sub-layer, and the second of the two sub-layers comprises a generalized additive model sub-layer.

3. The method of claim 2, wherein the feed-forward neural network sub-layer utilizes a shared-neuron architecture.

4. The method of claim 2, wherein the feed-forward neural network sub-layer utilizes a separated-neuron architecture.

5. The method of claim 2, wherein the generalized additive model sub-layer utilizes an identity function.

6. The method of claim 2, wherein the generalized additive model sub-layer utilizes a neural-network function.

7. The method of claim 1, wherein the interaction layer performs a multiplicative nonlinear transformation to obtain the plurality of values of the elements of the interaction layer.

8. The method of claim 1, wherein the input data comprises values that range over a discontinuous data range, the discontinuous data range comprises at least one discontinuity between two discrete values.

9. The method of claim 8, wherein data in the discontinuous data range comprises tabular data, the tabular data being quantized values organized in a data table.

10. The method of claim 9, wherein the quantized values are organized in the data table over a range in which fidelity of information that the quantized values represent is degraded.

11. The method of claim 8, wherein the at least one discontinuity divides the discontinuous data range into two sub-ranges that each converge to different points near the at least one discontinuity.

12. The method of claim 1, wherein the computer-implemented services comprise:

making a financial viability determination regarding the at least one client associated with the at least one client device; and extending a financial product offer to the at least one client associated with the at least one client device based on the financial viability determination.

13. The method of claim 12, wherein the input data comprises:

a marital status of the at least one client associated with the at least one client device; and a quantity of dependents of the at least one client associated with the at least one client device.

14. An inference model utilization device to obtain inferences using inference models, the inference model utilization device comprising:

a circuitry configured to obtain an inference model, the inference model comprising a conjoined neural network inference model;

communication hardware configured to obtain input data for the conjoined neural network inference model from at least one client associated with at least one client device;

services circuitry configured to obtain, using the input data, output data from the conjoined neural network inference model by:

projecting, by an input layer of the conjoined neural network inference model, the input data onto two sub-layers of a hidden layer of the conjoined neural network inference model;

generating, by the two sub-layers of the hidden layer of the conjoined neural network inference model, two pluralities of intermediate outputs comprising a first plurality of intermediate outputs generated by a first of the two sub-layers and a second plurality of intermediate outputs generated by a second of the two sub-layers;

combining, by an interaction layer of the conjoined neural network inference model, the two pluralities of intermediate outputs to obtain a plurality of values of elements of an of the interaction layer;

projecting, by the interaction layer, the plurality of values of the elements of the interaction layer on an output layer of the conjoined neural network inference model; and generating, by the output layer and using the projected plurality of values, the output data, wherein the communication hardware is further configured to provide, at least in part, computer-implemented services to the at least one client associated with the at least one client device using the output data.

15. The inference model utilization device of claim 14, wherein the circuitry comprises an inference model generator configured to obtain the inference model by generating the inference model.

16. The inference model utilization device of claim 14, wherein the first of the two sub-layers comprises a feed-forward neural network sub-layer, and wherein the second of the two sub-layers comprises a generalized additive model sub-layer.

17. The inference model utilization device of claim 16, wherein the feed-forward neural network sub-layer utilizes a shared-neuron architecture.

18. The inference model utilization device of claim 16, wherein the feed-forward neural network sub-layer utilizes a separated-neuron architecture.

19. The inference model utilization device of claim 14, wherein the input data comprises values that range over a discontinuous data range, the discontinuous data range comprises at least one discontinuity between two discrete values.

20. The inference model utilization device of claim 19, wherein data in the discontinuous data range comprises tabular data, the tabular data comprising quantized values organized in a data table.

* * * * *